July 12, 1932.  G. LINDVALL  1,866,813
CHAIN SHACKLE
Filed Feb. 24, 1931
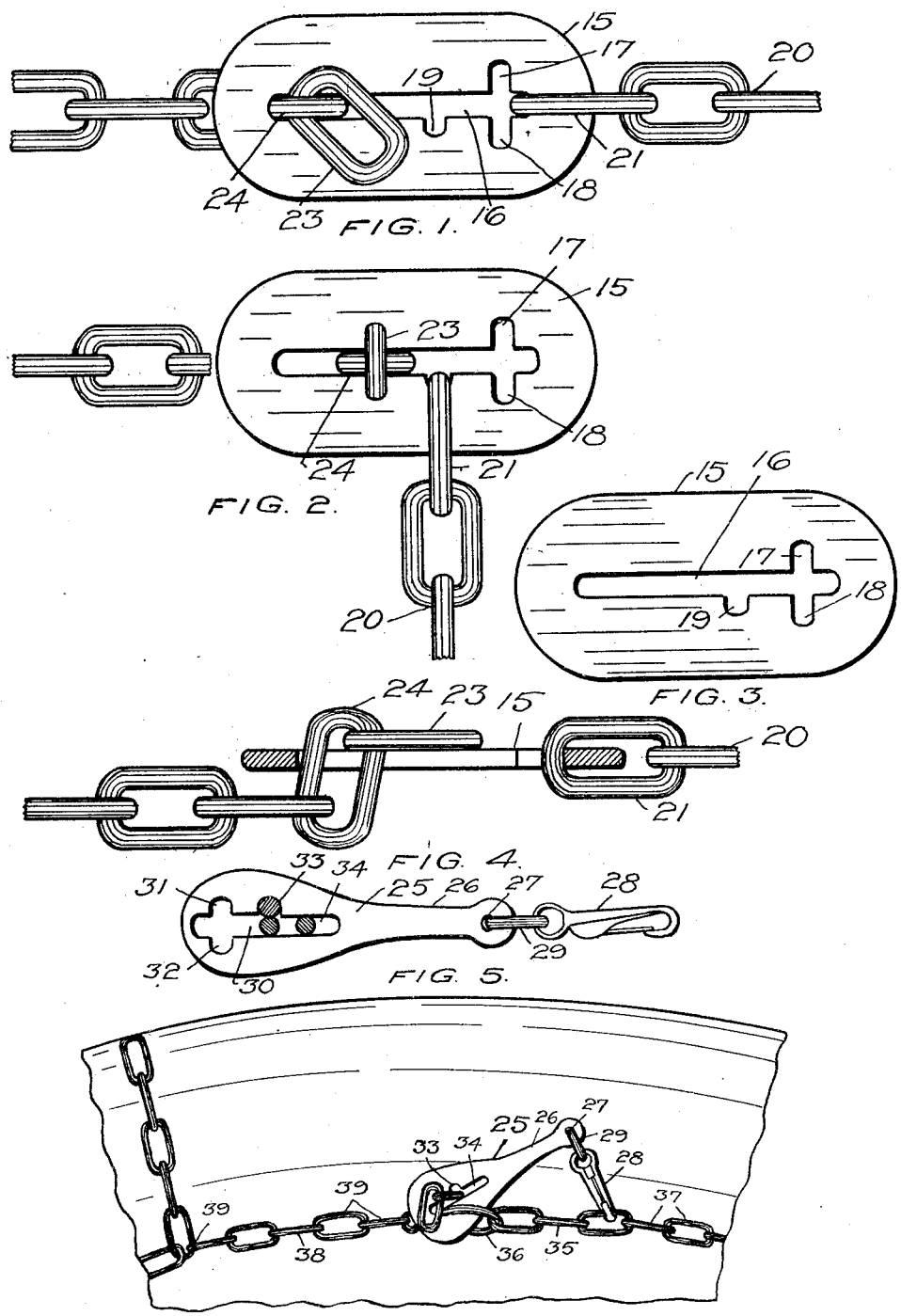

Patented July 12, 1932

1,866,813

UNITED STATES PATENT OFFICE

GUSTAF LINDVALL, OF PORT MENIER, ANTICOSTI ISLAND, CANADA

CHAIN SHACKLE

Application filed February 24, 1931. Serial No. 517,792.

The invention relates to a chain shackle, as described in the present specification and illustrated in the accompanying drawing that forms part of the same.

The invention consists essentially in the novel disposition of a link of a chain in relation to the insertion of another link in the shackle member as pointed out in the claims for novelty following a description in detail of the preferred construction.

The objects of the invention are to facilitate the joining together of the ends of chains in logging and other operations where a simple movement of the link of the anchored chain is all that is necessary to fasten into its place the loose end of a chain, that is to say, where chains large or small are used in rough operations, the use of dogs or hooks becomes both unsafe and frequently impractical both through the insecurity of the fastening and the difficulty of handling the chains; to avoid many dangers incident to logging operations such as slips and the consequent tumbling of the logs often resulting in the loss of life and damage to property; to maintain the equipment in good condition, which means that where hooks are frequently broken and lost and the swivels jammed, the plate shackle can never be out of order for it is a link in itself with no moving part; to furnish a chain fastening for many other purposes such as traction use, especially in motor vehicles operated on pneumatic tires; and generally to provide for chain work in many directions a shackle member that will be the equivalent of a link as well as a chain tightener where required.

In the drawing, Figure 1 is a plan view of the chain fastening, showing the chain ends attached thereto.

Figure 2 is a plan view showing the inserted chain end, which is beyond the disposed link of the anchored chain.

Figure 3 is a plan view of the shackle plate.

Figure 4 is a longitudinal sectional view of the chain fastening through Figure 1.

Figure 5 is a plan view of the chain fastening adapted for traction use and other purposes showing the disposition of the links in cross section.

Figure 6 is an elevational view of the fastening showing its application to a traction chain on a vehicle tire.

Like numerals of reference indicate corresponding parts in the various figures.

Referring to the drawing, the numeral 15 indicates the shackle plate which is preferably rounded at the ends, that is to say, it is of an elongated oval shape having the longitudinal slot 16 extending from an intermediate point towards one end to an intermediate point towards the other end, and adjacent to one end having the cross slots 17 and 18 registering with the longitudinal slot 16.

The passing slot 19 branches from the longitudinal slot 16 a short distance inwardly from the cross slot 18 and is not of as great a depth as the said cross slot 18.

The chain end 20 has the link 21 permanently secured in the longitudinal slot 16 and is free to move from either end to the passing slot 19.

The loose chain end is inserted in the cross slot end of the longitudinal slot 16, the end link 23 being inserted in the cross slots 17 and 18 and drawing the second link 24 into the longitudinal slot 16.

The second link 24 may now be moved along the longitudinal slot readily passing the end link 21 of the chain end 20, as this link 21 is introduced into the passing slot 19 in order to permit the link 24 to pass. The link 21 is then removed from the passing slot 19 and resumes its place in the longitudinal slot 16 beyond the cross slots 17 and 18.

The chain ends are now irremovably fastened so that they cannot in any way be shaken apart for the link passing down to the cross slots will not permit the end link 23 to register with the cross slots 17 and 18.

In the application of this invention to any chain requiring the ends to be brought together for tightening purposes such as automobile traction chains, the shackle plate is preferably made in different shape. This shackle plate 25 is preferably pear shaped and extends into the handle 26 having the eye-hole 27 at the end, and the snap hook 28 secured to said handle by the ring 29 passing through said eye-hole.

The longitudinal slot 30 of the shackle member is formed with the cross slots 31 and 32, narrowing to one end, and the passing slot 33 intermediate of the distance between the cross slot 32 and the end of the longitudinal slot, said longitudinal slot being reduced in width from the passing slot 33 to the end therebeyond, that is to say, the reduced portion 34 of the longitudinal slot 30 extends from one end to the passing slot.

The chain end 35 is secured to the ring 36 which in cross section is of slightly greater diameter than the links 37 of this chain, thus this ring will readily fit in the enlarged portion of the shackle plate slot, while it will not enter the reduced portion 34 of said longitudinal slot 30.

The chain end 38 is formed of links 39 similar to the links 37 and these links will readily pass into the longitudinal slot 30, thus when the ring 36 is moved to the passing slot 33 the end link of the chain end 38 may be inserted in exactly the same way as hereinbefore described and moved along into the reduced portion 34 passing the ring 36 which is in the passing slot 33.

The ring 36 is now removed from the passing slot and must slide back into the cross slot end of the longitudinal slot. The handle 26 is then brought around and linked or fastened to the chain end 35 by means of the snap hook 28 snapped on to an inner link, thus the two chain ends are brought together, that is to say, they are crowded down into the cross slot end of the longitudinal slot 30 which is the desirable positions for them, as there is no possible way of either chain end being separated from the shackle, and this is done without the aid of any other part beyond the simple snap hook holding the shackle in place.

What I claim is:—

1. A chain fastening comprising a shackle plate having a longitudinal slot, a slot in cross form towards one end and a reduced extension towards the other end and a passing slot at the junction of the wide and narrower portions and a permanent ring or link fitted to slide in said larger slot portion and blocked from the narrower slot portion.

2. A chain fastening comprising a shackle plate having a longitudinal slot extending the greater part of the length of the plate and transverse extensions from the longitudinal slot adjacent to one end thereof and a chain link recess intermediate of the length of the longer reach of the longitudinal slot and a chain having one link in operating position engaging the shackle plate in the shorter reach of the longitudinal slot and adapted to be moved along the longitudinal slot past the transverse slots to said recess for the insertion of the other end of the chain into said slots and along the longer reach of the longitudinal slot.

Signed at Port Menier, Anticosti, Que., this 5th day of December, 1930.

GUSTAF LINDVALL.